United States Patent
Schnoor et al.

(10) Patent No.: US 10,329,478 B2
(45) Date of Patent: Jun. 25, 2019

(54) ALDEHYDES AS A CATALYST FOR AN OXIDATIVE BREAKER

(71) Applicant: Halliburton Energy Services, Inc., Houston, TX (US)

(72) Inventors: Eli Allen Schnoor, Kingwood, TX (US); Dipti Singh, Kingwood, TX (US); Aaron Gene Russell, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/524,870

(22) PCT Filed: Dec. 18, 2014

(86) PCT No.: PCT/US2014/071070
§ 371 (c)(1),
(2) Date: May 5, 2017

(87) PCT Pub. No.: WO2016/099502
PCT Pub. Date: Jun. 23, 2016

(65) Prior Publication Data
US 2017/0335172 A1    Nov. 23, 2017

(51) Int. Cl.
*C09K 8/88*    (2006.01)
*C09K 8/04*    (2006.01)
(Continued)

(52) U.S. Cl.
CPC ............ *C09K 8/88* (2013.01); *C09K 8/04* (2013.01); *C09K 8/68* (2013.01); *C09K 8/685* (2013.01);
(Continued)

(58) Field of Classification Search
None
See application file for complete search history.

(56) References Cited

U.S. PATENT DOCUMENTS 5,420,174 A * 5/1995 Dewprashad .......... C09K 8/685
                                                                507/220
5,604,186 A * 2/1997 Hunt ........................ C09K 8/62
                                                                166/300
(Continued)

FOREIGN PATENT DOCUMENTS

WO    2007/020390 A1    2/2007
WO    2012125890 A2    9/2012
(Continued)

OTHER PUBLICATIONS

Office Action issued in related AU Application No. 2014414017, dated Sep. 15, 2017 (7 pages).
(Continued)

*Primary Examiner* — Andrew Sue-Ako
(74) *Attorney, Agent, or Firm* — Thomas Rooney; Baker Botts L.L.P.

(57) ABSTRACT

The present disclosure relates to systems and methods for using aldehydes as a catalyst for oxidative breakers. An embodiment of the present disclosure is a method comprising: providing a treatment fluid that comprises: an aqueous base fluid, a polymeric gelling agent, a breaker that comprises an oxidative salt, and a catalyst that comprises an aldehyde; allowing the breaker to interact with the polymeric gelling agent; and allowing the viscosity of the treatment fluid to reduce.

16 Claims, 7 Drawing Sheets

(51) Int. Cl.
  *C09K 8/68* (2006.01)
  *C09K 8/70* (2006.01)
  *C09K 8/90* (2006.01)
  *C09K 8/92* (2006.01)
  *E21B 43/267* (2006.01)

(52) U.S. Cl.
  CPC .................. *C09K 8/70* (2013.01); *C09K 8/90* (2013.01); *C09K 8/92* (2013.01); *E21B 43/267* (2013.01); *C09K 2208/26* (2013.01)

(56) References Cited

U.S. PATENT DOCUMENTS

| | | |
|---|---|---|
| 7,334,640 B2 | 2/2008 | Hanes, Jr. et al. |
| 7,712,535 B2 | 5/2010 | Venditto et al. |
| 7,888,297 B2 | 2/2011 | Hanes, Jr. et al. |
| 8,481,462 B2 | 7/2013 | Lin et al. |
| 2004/0242430 A1 | 12/2004 | Griffin et al. |
| 2006/0090895 A1 | 5/2006 | Chatterji et al. |
| 2008/0070806 A1 | 3/2008 | Lin et al. |
| 2009/0221453 A1 | 9/2009 | Mukhopadhyay et al. |
| 2011/0005969 A1* | 1/2011 | Giffin ............... C09K 8/685 208/14 |
| 2013/0130948 A1 | 5/2013 | Crews |
| 2013/0213657 A1 | 8/2013 | Dobson, Jr. et al. |

FOREIGN PATENT DOCUMENTS

| | | |
|---|---|---|
| WO | 2015095503 A1 | 6/2015 |
| WO | 2015126676 A1 | 8/2015 |

OTHER PUBLICATIONS

International Preliminary Report on Patentability issued in related Application No. PCT/US2014/071070, dated Jun. 29, 2017 (7 pages).

International Search Report and Written Opinion issued in related PCT Application No. PCT/US2014/071070 dated Aug. 25, 2015, 11 pages.

* cited by examiner

ALDEHYDES AS A CATALYST FOR AN OXIDATIVE BREAKER

CROSS-REFERENCE TO RELATED APPLICATION

The present application is a U.S. National Stage Application of International Application No. PCT/US2014/071070 filed Dec. 18, 2014, which is incorporated herein by reference in its entirety for all purposes.

BACKGROUND

The present disclosure relates to systems and methods for treating subterranean formations with treatment fluids.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

One common production stimulation operation that employs a treatment fluid is hydraulic fracturing. Hydraulic fracturing operations generally involve pumping a treatment fluid (e.g., a fracturing fluid) into a wellbore that penetrates a subterranean formation at a sufficient hydraulic pressure to create or enhance one or more cracks, or "fractures," in the subterranean formation. The fracturing fluid may comprise particulates, often referred to as "proppant," that are deposited in the fractures. The proppant particulates, inter alia, prevent the fractures from fully closing upon the release of hydraulic pressure, forming conductive channels through which fluids may flow to the wellbore. Once at least one fracture is created and the proppant particulates are substantially in place, the fracturing fluid may be "broken" (i.e., the viscosity is reduced), and the fracturing fluid may be recovered from the formation.

Maintaining sufficient viscosity in these treatment fluids is important for a number of reasons. Maintaining sufficient viscosity is important in fracturing treatments for particulate transport and/or to create or enhance fracture width. Also, maintaining sufficient viscosity may be important to control and/or reduce fluid loss into the formation. Moreover, a treatment fluid of a sufficient viscosity may be used to divert the flow of fluids present within a subterranean formation (e.g., formation fluids, other treatment fluids) to other portions of the formation, for example, by "plugging" an open space within the formation. At the same time, while maintaining sufficient viscosity of the treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric gelling agents may be added to the treatment fluids. Examples of commonly used polymeric gelling agents include, but are not limited to, guar gums and derivatives thereof, cellulose derivatives, biopolymers, polysaccharides, synthetic polymers, and the like. To further increase the viscosity of a treatment fluid, often the molecules of the gelling agent are "crosslinked" with the use of a crosslinking agent. Conventional crosslinking agents may comprise a metal ion or other ion that interacts with at least two polymer molecules to form a "crosslink" between them.

At some point in time, e.g., after a viscosified treatment fluid has performed its desired function, the viscosity of the viscosified treatment fluid should be reduced. This is often referred to as "breaking the gel" or "breaking the fluid." This can occur by, inter alia, reversing the crosslink between crosslinked polymer molecules, breaking down the molecules of the polymeric gelling agent, or breaking the crosslinks between polymer molecules. The use of the term "break" herein incorporates at least all of these mechanisms and/or any other mechanism for reducing the viscosity of a treatment fluid. Certain breakers comprising sodium bromate, sodium chlorite, and other oxidizing agents have been used to reduce the viscosity of treatment fluids comprising crosslinked polymers. Catalysts may be used to activate the breaker. Many breaker/catalyst combinations are most effective in a particular pH and temperature range. Using the breaker/catalyst combination outside of its optimum fluid conditions may requires an excess of breaker and/or catalyst. However, high concentrations of breaker and/or additional catalysts may be problematic in some cases since they may, among other things, increase the cost and complexity of a treatment fluid, adversely affect other components of the treatment fluid, and/or leave damaging residues in the subterranean formations where they are used.

BRIEF DESCRIPTION OF THE DRAWINGS

These drawings illustrate certain aspects of some of the embodiments of the present disclosure, and should not be used to limit or define the claims.

Figure 1:
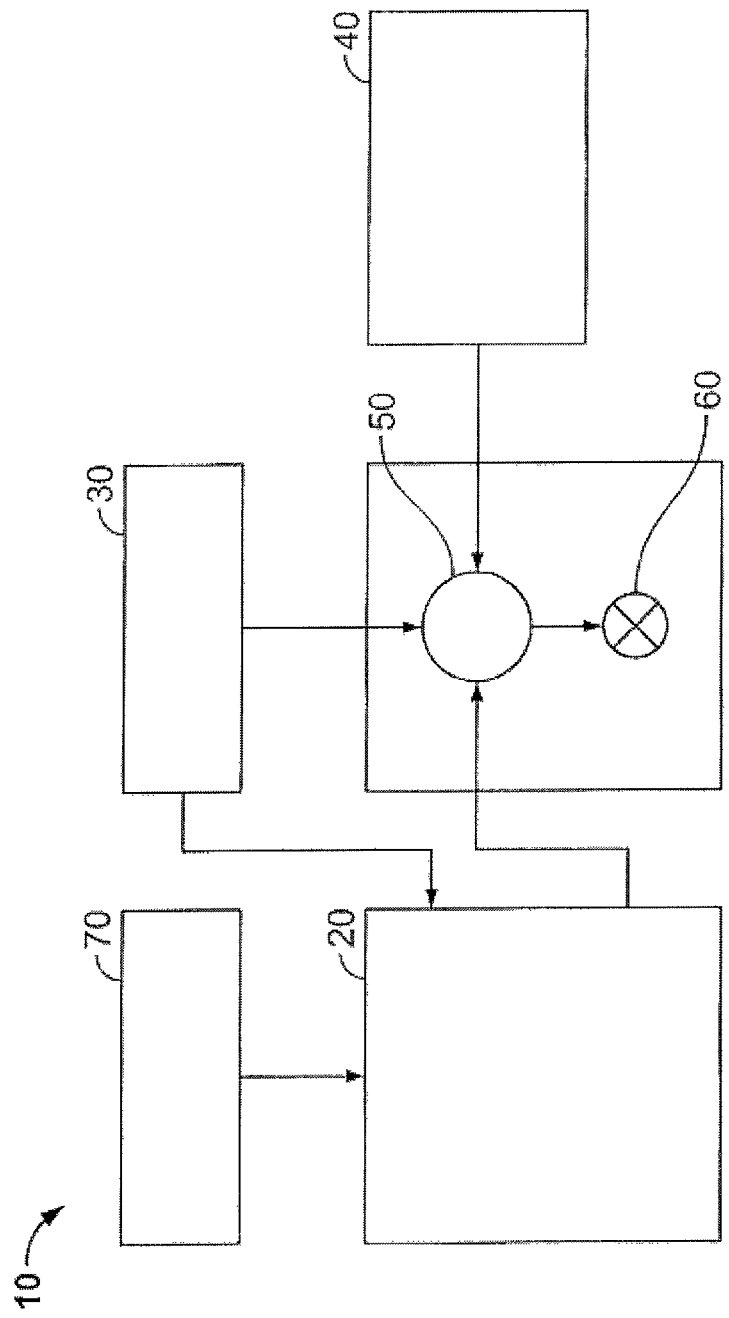
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations using treatment fluids. More particularly, the present disclosure relates to systems and methods for using aldehydes as a catalyst for oxidative breakers. While the systems and methods of the present disclosure may be particularly well-suited for fracturing fluids, the systems and methods may be applied to a variety of treatment fluids where a reduction in viscosity is desired, including but not limited to consolidation fluids, drilling fluids, fracturing fluids, completion fluids, workover fluids, packer fluids, and spacer fluids.

In the methods, systems, and compositions of the present disclosure, one or more aldehydes (e.g., glutaraldehyde) act as a catalyst for certain oxidative breakers, including chlorite salt breakers. Many oxidative salts used as breakers require catalysts to activate at temperature below 250° F. In certain embodiments of the present disclosure, aldehydes such as glutaraldehyde may have catalytic properties which activate a chlorite salt breaker over a wide temperature range (140° F. to 275° F.) for a variety of fluid types.

The systems and methods of the present disclosure generally involve a treatment fluid that comprises a base fluid, a polymeric gelling agent, an oxidative breaker, and a catalyst that comprises an aldehyde. The treatment fluid may be used in any situation where a high viscosity fluid is desired including, but not limited to, subterranean fracturing operations. When the viscosity of the treatment fluid needs to be reduced, for example, after the treatment has completed, the breaker may be activated by the catalyst and used to reduce the viscosity of the treatment fluid.

Among the many potential advantages to the systems and methods of the present disclosure, only some of which are alluded to herein, the systems and methods of the present disclosure may provide a simpler and more efficient breaker system for viscosified treatment fluids. Conventionally, metal catalysts are used to activate oxidative breakers but this often adds additional costs and complexity to the fracturing fluid. These metal catalysts often require large concentrations below 200° F. to activate the oxidative breakers, and even then may not be capable of producing a quick break time. As a catalyst, aldehydes may able to activate oxidative breakers more efficiently at temperatures as low as 140° F.

The treatment fluids used in the systems and methods of the present disclosure may comprise any aqueous base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, many water sources including seawater and produced water may comprise a variety of divalent cationic species dissolved therein. In certain embodiments, the pH of the aqueous fluid may be adjusted (e.g., by a buffer or other pH adjusting agent) to a specific level, which may depend on, among other factors, the types of viscosifying agents, crosslinkers, and additional additives used in creating the fracturing fluid. One of ordinary skill in the art, with the benefit of this disclosure, will recognize when such density and/or pH adjustments are appropriate. In certain embodiments, the fracturing fluids may comprise a mixture of one or more fluids and/or gases, including but not limited to emulsions, foams, and the like.

The polymeric gelling agent used in the systems and methods of the present disclosure may comprise a variety of natural and synthetic polymers, including any and all combinations thereof. Suitable natural polymers may include alginate, chitosan, cyclosophoran, dextran, galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar (including hydroxypropyl guar, carboxy methyl guar, and carboxymethyl hydroxylpropyl guar), gum ghatti, gum arabic, locust bean gum, cellulose, and derivatized cellulose (including carboxymethyl cellulose, hydroxyethyl cellulose, carboxymethyl hydroxyethyl cellulose, hydroxypropyl cellulose, methyl hydroxyl ethyl cellulose), and any derivative or combination thereof. Suitable synthetic polymers may include acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, quaternized aminoalkyl acrylate (such as a copolymer of acrylamide and dimethylaminoethyl acrylate quaternized with benzyl chloride), poly(vinyl acetate), poly(vinyl alcohol), poly(ethylene glycol), poly(vinyl pyrrolidone), and any derivative or combination thereof.

The polymeric gelling agent may be present in the treatment fluid in an amount sufficient to obtain a desired viscosity for a particular purpose. In certain embodiments, the treatment fluid has a viscosity of about 500 cP to about 5000 cP at 40 s$^{-1}$. In certain embodiments, the polymeric gelling agent is present in the treatment fluid in a concentration of about 0.01% to about 5% weight by weight. In other embodiments, the polymeric gelling agent is present in the treatment fluid in a concentration of about 0.18% to about 1% weight by weight. In other embodiments, the polymeric gelling agent is present in the treatment fluid in a concentration of about 0.2% to about 0.5% weight by weight.

In some embodiments, the treatment fluid may further comprise a crosslinking agent. Suitable crosslinking agents may include boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, zirconium glycolate, titanium lactate, zirconium triethanol amine glycolate, zirconium lactate glycolate, zirconium triethanol amine, titanium malate, titanium citrate, titanium ammonium lactate, titanium triethanolamine, titanium acetylacetonate, aluminum lactate, aluminum citrate, antimony compounds, chromium compounds, iron compounds, derivatives thereof, and combinations thereof. In certain embodiments, the crosslinking agent is present in the treatment fluid in a concentration of about 0.0015% to about 0.1% weight by weight. In other embodiments, the crosslinking agent is present in the treatment fluid in a concentration of about 0.003% to about 0.075% weight by weight. In other embodiments, the crosslinking agent is present in the treatment fluid in a concentration of about 0.005% to about 0.05% weight by weight.

In certain embodiments, the treatment fluids used in the systems and methods of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, clay control agents, biocides, friction reducers, antifoam agents, bridging agents, flocculants, additional $H_2S$ scavengers, $CO_2$ scavengers, oxygen scavengers, lubricants, additional viscosifiers, weighting agents, relative permeability modifiers, resins, wetting agents, coating enhancement agents, filter cake removal agents, antifreeze agents (e.g., ethylene glycol), and the like. In certain embodiments, one or more of these additional additives may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The oxidative breaker used in the systems and methods of the present disclosure may comprise any suitable oxidative breaker. Examples of suitable oxidative breakers include breakers comprising chlorite salts, chlorate salts, perchlorate salts, bromate salts, iodate salts and periodate salts and any combination thereof. The salt may have any cation that does not interfere with the treatment operations including, but not limited to, alkali metals (Na, K, etc.), alkaline earth metals (Mg, Ca, etc.), transition metals (Fe, Cu, etc.), post-transition metals (Al, Bi, etc.), metalliods (Si, Ge, etc.), and polyatomic cations ($NH_4$). An example of a suitable oxidative breaker is a chlorite salt breaker. In certain embodiments, the breaker interacts with the gelling agent to reduce the viscosity.

The oxidative breaker may be included in or added to the treatment fluid to break the treatment fluid by reducing its viscosity. In certain embodiments, the breaker is added to the treatment fluid in a concentration of about 0.00625% to about 0.25% weight by weight. In other embodiments, the breaker is added to the treatment fluid in a concentration of about 0.025% to about 0.175% weight by weight. In other embodiments, the breaker is added to the treatment fluid in a concentration of about 0.075% to about 0.125% weight by weight. In certain embodiments, the breaker may be added to the treatment fluid before the treatment fluid is introduced into the wellbore and/or subterranean formation but not activated by the catalyst until the time when a reduction of the treatment fluid's viscosity is desired.

The catalyst used in the systems and methods of the present disclosure may comprise any aldehyde known in the art. Examples of aldehydes that may be suitable for use in certain embodiments of the present disclosure include, but are not limited to, alkyl aldehydes, vinyl aldehydes, aromatic aldehydes, and any derivative or combination thereof. In one embodiment, the catalyst comprises glutaraldehyde. In some embodiments, the catalyst interacts with the breaker to activate the breaker.

The catalyst may be included in or added to the treatment fluid to activate the breaker. In certain embodiments, the catalyst is included in or added to the treatment fluid in a concentration of about 0.0025% to about 0.05% weight by weight. In other embodiments, the catalyst is added to the treatment fluid in a concentration of about 0.005% to about 0.0375% weight by weight. In other embodiments, the catalyst is added to the treatment fluid in a concentration of about 0.0075% to about 0.025% weight by weight. In some embodiments, the catalyst may be added to the treatment fluid before the treatment fluid is introduced into the wellbore and/or subterranean formation.

In certain embodiments, the break time of the treatment fluid can be tailored by altering the concentration of the breaker and/or the catalyst. In certain embodiments, the desired break times can range from about 30 minutes to several hours depending on circumstances including, but not limited to, the job design and how long the treatment fluid needs to suspend proppant during fracturing operation. By changing the ratios of the breaker and the catalyst, it could be possible to formulate several breaker/catalyst combinations which would result in the desired break time, giving flexibility to the fluid design. In some embodiments, the breaker and/or the catalyst may be coated to delay their activation until a desired time.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as fracture acidizing or matrix acidizing. In certain embodiments, a treatment fluid may be introduced into a subterranean formation or a portion of a subterranean formation. In some embodiments, the treatment fluid may be introduced into a wellbore that penetrates a subterranean formation. In some embodiments, the treatment fluid may be introduced at a pressure sufficient to create or enhance one or more fractures within the subterranean formation (e.g., hydraulic fracturing).

As previously described, in certain embodiments, the gelling agent and optional crosslinking agent may provide the treatment fluid with increased viscosity suitable for the desired subterranean treatment. When the subterranean treatment has concluded, the viscosity of the treatment fluid may be reduced using the breaker and the catalyst. In particular, in certain embodiments, the catalyst activates the breaker and the breaker is allowed to interact with the gelling agent. In various embodiments, the breaker interacts with the gelling agent by reversing the crosslink between crosslinked polymer molecules, breaking down the molecules of the polymeric gelling agent, or breaking the crosslinks between polymer molecules. In some embodiments, after the viscosity of the treatment fluid has been reduced, the treatment fluid may be removed from the subterranean formation.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
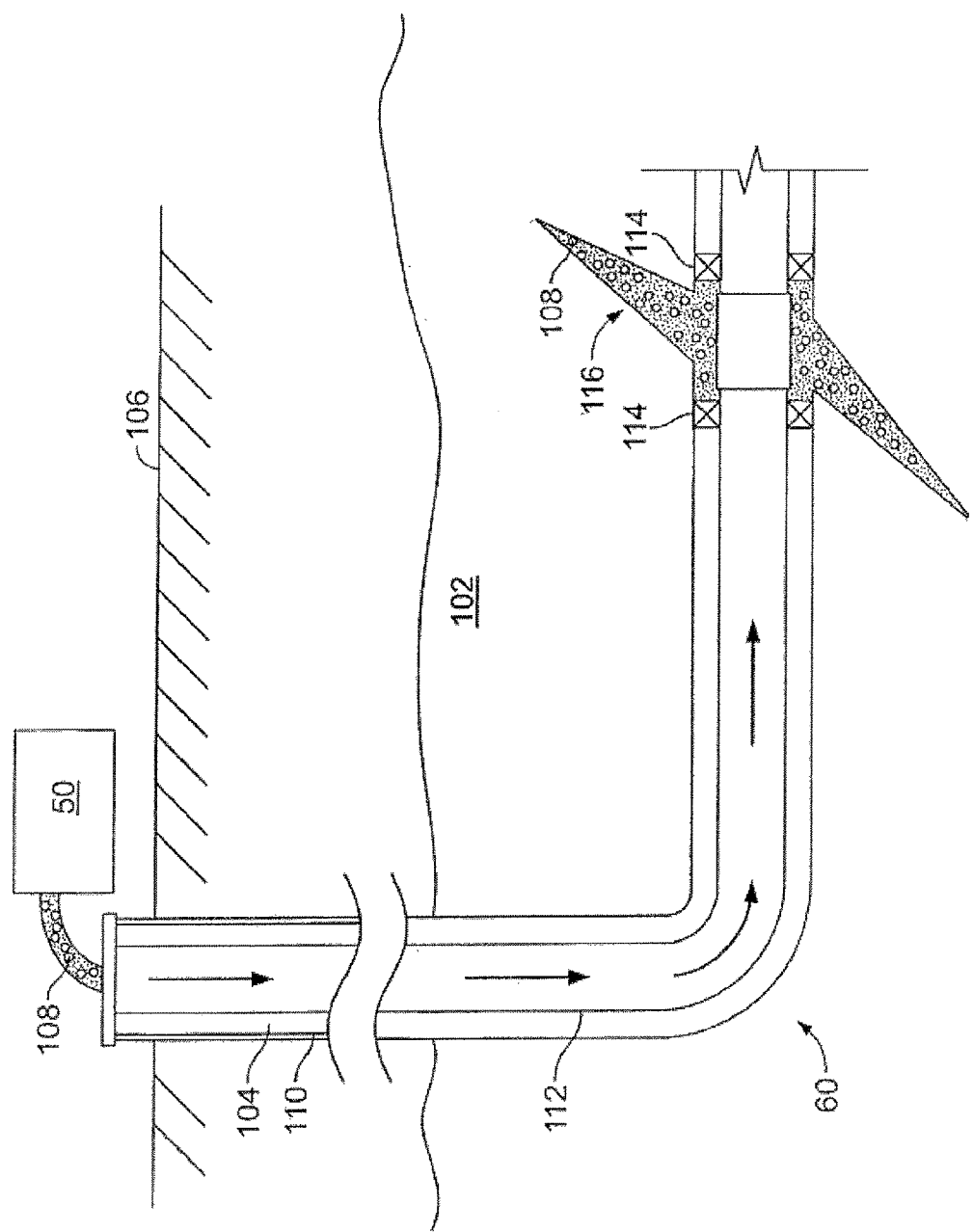
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to communicate the fracturing fluid 108 directly into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

In certain examples of embodiments of the present disclosure, glutaraldehyde has shown a catalytic effect on a chlorite salt breaker over a temperature of 140° to 200° F. The catalytic effect of glutaraldehyde was sustained at these temperatures without increasing the concentration of glutaraldehyde in these examples of certain embodiments of the present disclosure. Unlike existing metal catalysts, increasing the concentration of glutaraldehyde may not be necessary to decrease break times even at temperatures below 200° F. By comparison, chlorite salt breakers are often difficult to activate at temperatures below 200° F. without substantially increasing the concentration of existing catalysts.

Four series of tests were conducted to demonstrate the effectiveness of the synergistic combination of glutaraldehyde and a chlorite salt breaker to break fluids with different crosslinkers, including metal crosslinkers and borate crosslinkers. In each of the series of tests, different combinations of glutaraldehyde and the chlorite salt breaker were tested by adding them to the crosslinked fluid, raising the temperature, and observing the viscosity of the crosslinked fluid over time.

Figure 3:
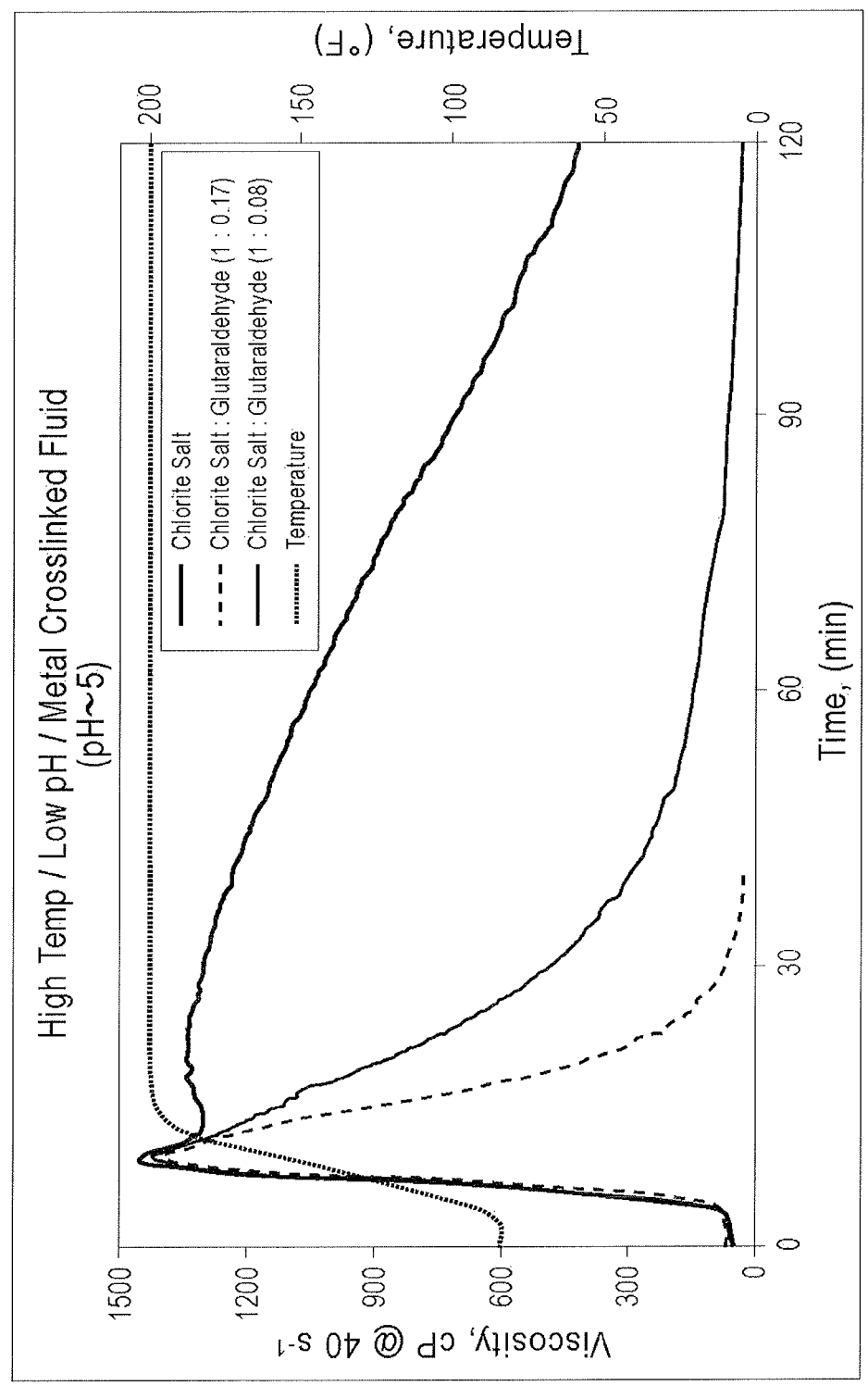
FIG. 3 is a graph illustrating the breaker profile for a metal crosslinked fluid system of the present disclosure using a chlorite salt breaker and glutaraldehyde at a temperature of 200° F.

The first series of tests evaluated the catalytic effect of glutaraldehyde on a metal crosslinked fluid at 200° F. FIG. 3 is a graph illustrating the breaker profile for a metal crosslinked fluid system using a chlorite salt breaker and glutaraldehyde at 200° F. The combination of glutaraldehyde and chlorite salt breaker reduced the viscosity of the metal crosslinked fluid faster than the use of chlorite salt breaker by itself.

Figure 4:
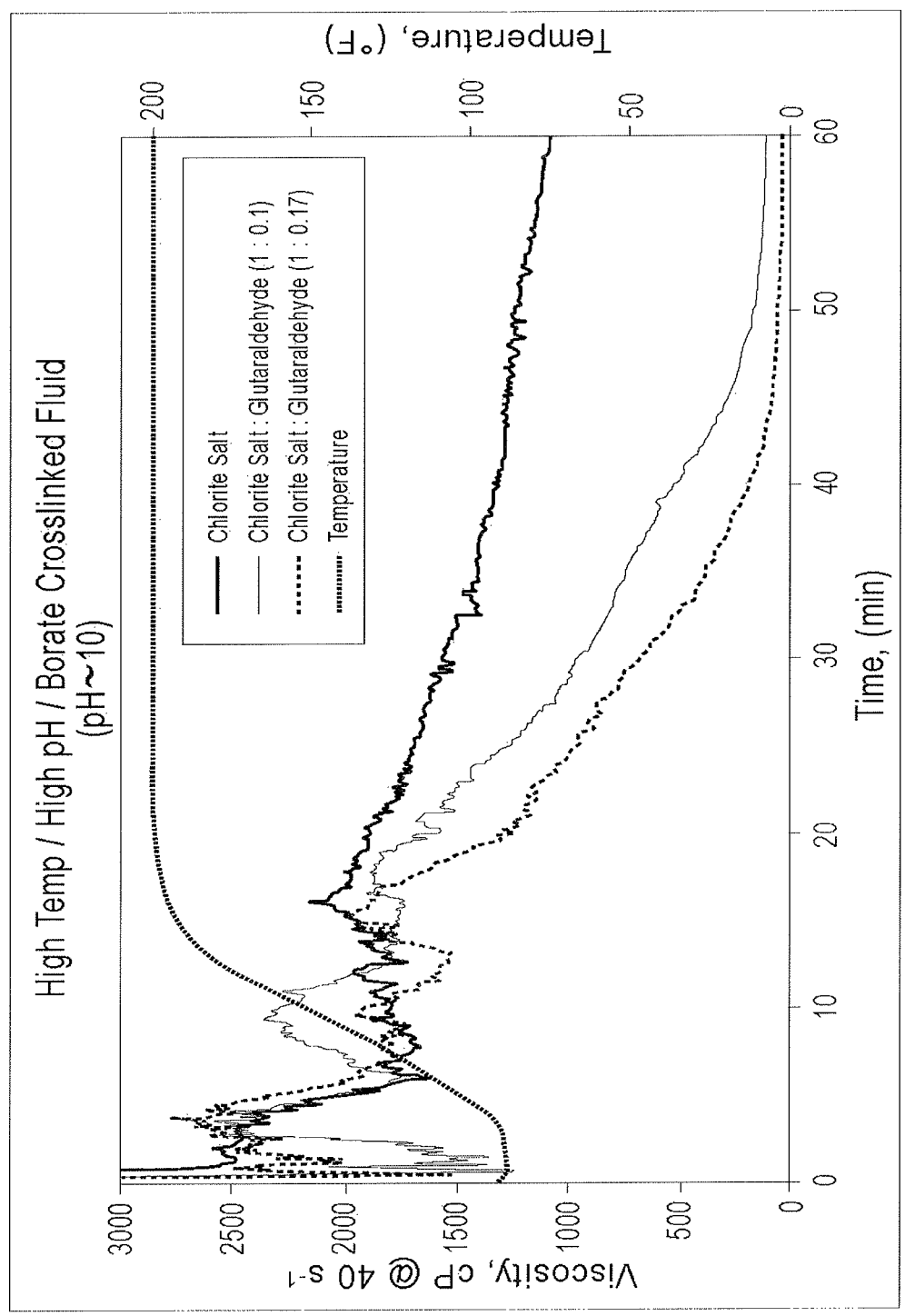
FIG. 4 is a graph illustrating the breaker profile for a borate crosslinked fluid system of the present disclosure using a chlorite salt breaker and glutaraldehyde at a temperature of 200° F.

The second series of tests evaluated the catalytic effect of glutaraldehyde on a borate crosslinked fluid at 200° F. FIG. 4 is a graph illustrating the breaker profile for a borate crosslinked fluid system using a chlorite salt breaker and glutaraldehyde at 200° F. Similarly, the combination of glutaraldehyde reduced the viscosity of the borate crosslinked fluid faster than the use of the chlorite salt breaker by itself.

Figure 5:
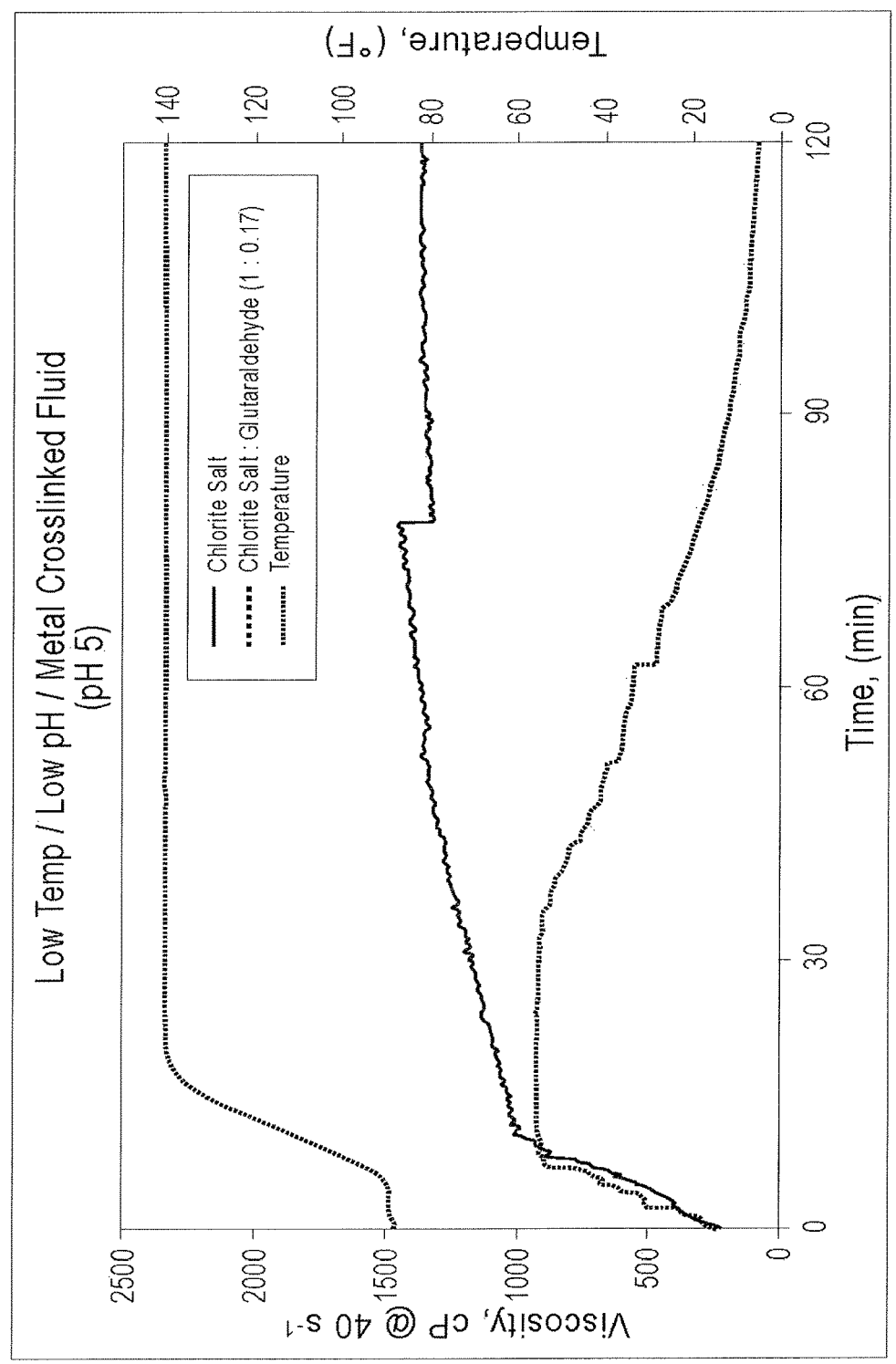
FIG. 5 is a graph illustrating the breaker profile for a metal crosslinked fluid system of the present disclosure using a chlorite salt breaker and glutaraldehyde at a temperature of 140° F.

The third series of tests evaluated the catalytic effect of glutaraldehyde on a metal crosslinked fluid at a lower temperature. FIG. 5 is a graph illustrating the breaker profile for a metal crosslinked fluid system using a chlorite salt breaker and glutaraldehyde at a temperature of 140° F. The combination of glutaraldehyde and chlorite salt breaker reduced the viscosity of the metal crosslinked fluid even at this lower temperature. In contrast, the viscosity actually increased when exposed to the chlorite salt breaker itself.

Figure 6:
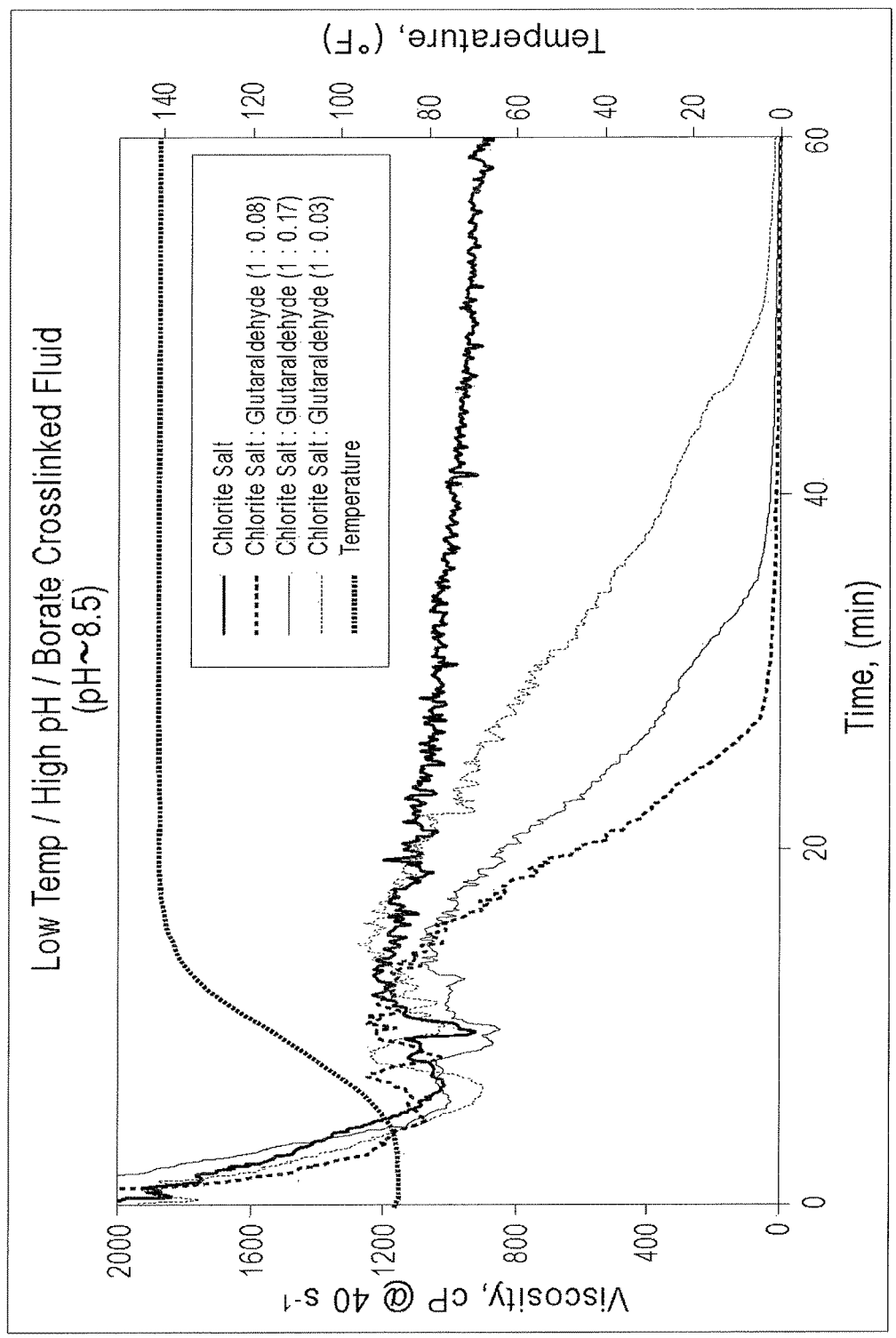
FIG. 6 is a graph illustrating the breaker profile for a borate crosslinked fluid system of the present disclosure using a chlorite salt breaker and glutaraldehyde at a temperature of 140° F.

The fourth series of tests evaluated the catalytic effect of glutaraldehyde on a borate crosslinked fluid at the lower temperature. FIG. 6 is a graph illustrating the breaker profile for a borate crosslinked fluid system using a chlorite salt breaker and glutaraldehyde at a temperature of 140° F. The combination of glutaraldehyde and chlorite salt breaker also reduced the viscosity of the borate crosslinked fluid at this lower temperature.

The data also demonstrate that glutaraldehyde was effective over a wide range of pHs, including acidic and alkaline conditions. The tests using the metal crosslinked fluid were conducted at a pH of about 5. The tests using the metal crosslinked fluid were conducted at a pH of about 8.5-10. The glutaraldehyde demonstrated a catalytic effect at both the high and low pHs.

Example 2

Figure 7:
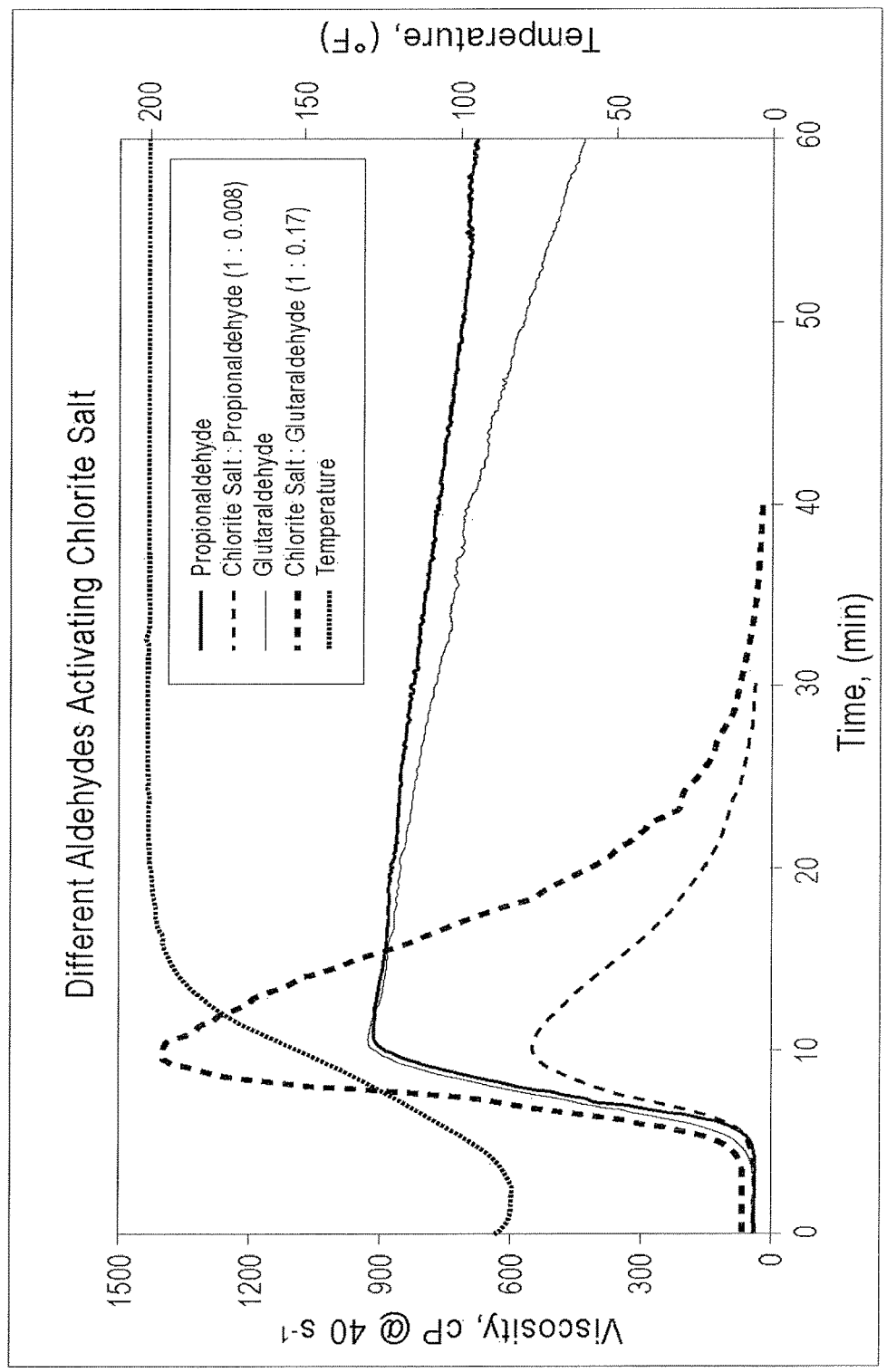
FIG. 7 is graph illustrating the relative effects of propionaldehyde and glutaraldehyde as catalysts for a chlorite salt breaker of the present disclosure.

A series of similar tests were also conducted to compare the effectiveness of different aldehydes as a catalyst for a chlorite salt breaker. In particular, propionaldehyde was compared to glutaraldehyde. As shown in FIG. 7, propionaldehyde exhibited a similar catalytic effect on a chlorite salt breaker at a temperature of 200° F.

An embodiment of the present disclosure is a method comprising: providing a treatment fluid that comprises: an aqueous base fluid, a polymeric gelling agent, a breaker that comprises an oxidative salt, and a catalyst that comprises an aldehyde; allowing the breaker to interact with the polymeric gelling agent; and allowing the viscosity of the treatment fluid to reduce. Optionally, the aldehyde is glutaraldehyde. Optionally, the oxidative salt comprises at least one salt selected from the group consisting of: a chlorite salt, a chlorate salt, a perchlorate salt, and any combination thereof. Optionally, the polymeric gelling agent comprises at least one polymer selected from the group consisting of: alginate, chitosan, cyclosophoran, dextran, galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, hydroxypropyl guar, carboxy methyl guar, carboxymethyl hydroxylpropyl guar, gum ghatti, gum arabic, locust bean gum, cellulose, carboxymethyl cellulose, hydroxyethyl cellulose, carboxymethyl hydroxyethyl cellulose, hydroxypropyl cellulose, methyl hydroxyl ethyl cellulose, acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, an acrylic acid ester, a methacrylic acid ester, quaternized aminoalkyl acrylate, poly(vinyl acetate), poly(vinyl alcohol), poly(ethylene glycol), and poly(vinyl pyrrolidone), and any combination thereof. Optionally, at least a portion of the polymeric gelling agent is crosslinked by a crosslinking reaction comprising a crosslinking agent. Optionally, the crosslinking agent comprises at least one crosslinking agent selected from the group consisting of: boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, zirconium glycolate, titanium lactate, zirconium triethanol amine glycolate, zirconium lactate glycolate, zirconium triethanol amine, titanium malate, titanium citrate, titanium ammonium lactate, titanium triethanolamine, titanium acetylacetonate, aluminum lactate, aluminum citrate, an antimony compound, a chromium compound, an iron compound, any derivative thereof, and any combination thereof. Optionally, the method further comprises introducing the treatment fluid into at least a portion of a wellbore. Optionally, the treatment fluid is introduced into the wellbore using one or more pumps.

Another embodiment of the present disclosure is a method comprising: introducing a treatment fluid into a portion of a subterranean formation, wherein the treatment fluid comprises: an aqueous base fluid, a polymeric gelling agent, a breaker that comprises an oxidative salt, and a catalyst that comprises an aldehyde; allowing the breaker to interact with the polymeric gelling agent; and allowing the viscosity of the treatment fluid to reduce. Optionally, the aldehyde is glutaraldehyde. Optionally, the oxidative salt comprises at least one salt selected from the group consisting of: a chlorite salt, a chlorate salt, a perchlorate salt, and any combination thereof. Optionally, the polymeric gelling agent comprises at least one polymer selected from the group consisting of: alginate, chitosan, cyclosophoran, dextran, galactoglucopolysaccharide, gellan, glucuronan, N-acetylglucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, hydroxypropyl guar, carboxy methyl guar, carboxymethyl hydroxylpropyl guar, gum ghatti, gum arabic, locust bean gum, cellulose, carboxymethyl cellulose, hydroxyethyl cellulose, carboxymethyl hydroxyethyl cellulose, hydroxypropyl cellulose, methyl hydroxyl ethyl cellulose, acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, an acrylic acid ester, a methacrylic acid ester, quaternized aminoalkyl acrylate, poly(vinyl acetate), poly(vinyl alcohol), poly(ethylene glycol), and poly(vinyl pyrrolidone), and any combination thereof. Optionally, at least a portion of the polymeric gelling agent is crosslinked by a crosslinking reaction comprising a crosslinking agent. Optionally, the crosslinking agent comprises at least one crosslinking agent selected from the group consisting of: boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, zirconium glycolate, titanium lactate, zirconium triethanol amine glycolate, zirconium lactate glycolate, zirconium triethanol amine, titanium malate, titanium citrate, titanium ammonium lactate, titanium triethanolamine, titanium acetylacetonate, aluminum lactate, aluminum citrate, an antimony compound, a chromium compound, an iron compound, any derivative thereof, and any combination thereof. Optionally, the treatment fluid is introduced into the portion of the subterranean formation using one or more pumps. Optionally, introducing the treatment fluid into the portion of the subterranean formation comprises introducing the treatment fluid at or above a pressure sufficient to create or enhance one or more fractures in the subterranean formation.

Another embodiment of the present disclosure is a composition comprising: an aqueous base fluid, a polymeric gelling agent, a breaker that comprises at least one salt selected from the group consisting of: a chlorite salt, a chlorate salt, a perchlorate salt, and any combination thereof, and a catalyst that comprises an aldehyde. Optionally, the aldehyde is glutaraldehyde. Optionally, the polymeric gelling agent comprises at least one polymer selected from the group consisting of: alginate, chitosan, cyclosophoran, dextran, galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, hydroxypropyl guar, carboxy methyl guar, carboxymethyl hydroxylpropyl guar, gum ghatti, gum arabic, locust bean gum, cellulose, carboxymethyl cellulose, hydroxyethyl cellulose, carboxymethyl hydroxyethyl cellulose, hydroxypropyl cellulose, methyl hydroxyl ethyl cellulose, acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, an acrylic acid ester, a methacrylic acid ester, quaternized aminoalkyl acrylate, poly(vinyl acetate), poly(vinyl alcohol), poly(ethylene glycol), and poly(vinyl pyrrolidone), and any combination thereof. Optionally, at least a portion of the polymeric gelling agent is crosslinked by a crosslinking reaction comprising a crosslinking agent and wherein the crosslinking agent comprises at least one crosslinking agent selected from the group consisting of: boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, zirconium glycolate, titanium lactate, zirconium triethanol amine glycolate, zirconium lactate glycolate, zirconium triethanol amine, titanium malate, titanium citrate, titanium ammonium lactate, titanium triethanolamine, titanium acetylacetonate, aluminum lactate, aluminum citrate, an antimony compound, a chromium compound, an iron compound, any derivative thereof, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    providing a treatment fluid that consists essentially of:
        an aqueous base fluid,
        a polymeric gelling agent,
        a breaker that comprises at least one oxidative salt selected from the group consisting of: a chlorite salt, a chlorate salt, a perchlorate salt, and any combination thereof, wherein the breaker is present in the treatment fluid in a range of about 0.00625% to about 0.25% weight by weight,
        a catalyst that comprises at least one aldehyde selected from the group consisting of: glutaraldehyde, propionaldehyde, and any combination thereof, wherein the catalyst is present in the treatment fluid in a range of about 0.0025% to about 0.05% weight by weight;
    allowing the breaker to interact with the polymeric gelling agent in the presence of the catalyst at a temperature in a range of about 140° F. to about 200° F.; and
    allowing the viscosity of the treatment fluid to break in less than about 60 minutes.

2. The method of claim 1 wherein the aldehyde is glutaraldehyde.

3. The method of claim 1 wherein the polymeric gelling agent comprises at least one polymer selected from the group consisting of: alginate, chitosan, cyclosophoran, dextran, galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, hydroxypropyl guar, carboxy methyl guar, carboxymethyl hydroxylpropyl guar, gum ghatti, gum arabic, locust bean gum, cellulose, carboxymethyl cellulose, hydroxyethyl cellulose, carboxymethyl hydroxyethyl cellulose, hydroxypropyl cellulose, methyl hydroxyl ethyl cellulose, acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, an acrylic acid ester, a methacrylic acid ester, quaternized aminoalkyl acrylate, poly(vinyl acetate), poly(vinyl alcohol), poly(ethylene glycol), and poly(vinyl pyrrolidone), and any combination thereof.

4. The method of claim 1 wherein at least a portion of the polymeric gelling agent is crosslinked by a crosslinking reaction comprising a crosslinking agent.

5. The method of claim 4 wherein the crosslinking agent comprises at least one crosslinking agent selected from the group consisting of: boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, zirconium glycolate, titanium lactate, zirconium triethanol amine glycolate, zirconium lactate glycolate, zirconium triethanol amine, titanium malate, titanium citrate, titanium ammonium lactate, titanium triethanolamine, titanium acetylacetonate, aluminum lactate, aluminum citrate, an antimony compound, a chromium compound, an iron compound, any derivative thereof, and any combination thereof.

6. The method of claim 1 further comprising introducing the treatment fluid into at least a portion of a wellbore.

7. The method of claim 6 wherein the treatment fluid is introduced into the wellbore using one or more pumps.

8. The method of claim 1, wherein the treatment fluid further contains at least one additional additive selected from the group consisting of: salts, surfactants, acids, proppant particulates, diverting agents, fluid loss control additives, gas, nitrogen, carbon dioxide, surface modifying agents, tackifying agents, foamers, corrosion inhibitors, scale inhibitors, clay control agents, biocides, friction reducers, antifoam agents, bridging agents, flocculants, additional H2S scavengers, CO2 scavengers, oxygen scavengers, lubricants, additional viscosifiers, weighting agents, relative permeability modifiers, resins, wetting agents, coating enhancement agents, filter cake removal agents, antifreeze agents, and any combination thereof.

9. A method comprising:
   introducing a treatment fluid into a portion of a subterranean formation, wherein the treatment fluid consists essentially of:
   an aqueous base fluid,
   a polymeric gelling agent,
   a breaker that comprises at least one oxidative salt selected from the group consisting of: a chlorite salt, a chlorate salt, a perchlorate salt, and any combination thereof, wherein the breaker is present in the treatment fluid in a range of about 0.00625% to about 0.25% weight by weight, and
   a catalyst that comprises at least one aldehyde selected from the group consisting of: glutaraldehyde, propionaldehyde, and any combination thereof, wherein the catalyst is present in the treatment fluid in a range of about 0.0025% to about 0.05% weight by weight;
   allowing the breaker to interact with the polymeric gelling agent in the presence of the catalyst at a temperature in a range of about 140° F. to about 200° F.; and
   allowing the viscosity of the treatment fluid to break in less than about 60 minutes.

10. The method of claim 9 wherein the aldehyde is glutaraldehyde.

11. The method of claim 9 wherein the polymeric gelling agent comprises at least one polymer selected from the group consisting of: alginate, chitosan, cyclosophoran, dextran, galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, hydroxypropyl guar, carboxy methyl guar, carboxymethyl hydroxylpropyl guar, gum ghatti, gum arabic, locust bean gum, cellulose, carboxymethyl cellulose, hydroxyethyl cellulose, carboxymethyl hydroxyethyl cellulose, hydroxypropyl cellulose, methyl hydroxyl ethyl cellulose, acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, an acrylic acid ester, a methacrylic acid ester, quaternized aminoalkyl acrylate, poly(vinyl acetate), poly(vinyl alcohol), poly(ethylene glycol), and poly(vinyl pyrrolidone), and any combination thereof.

12. The method of claim 9 wherein at least a portion of the polymeric gelling agent is crosslinked by a crosslinking reaction comprising a crosslinking agent.

13. The method of claim 12 wherein the crosslinking agent comprises at least one crosslinking agent selected from the group consisting of: boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, zirconium glycolate, titanium lactate, zirconium triethanol amine glycolate, zirconium lactate glycolate, zirconium triethanol amine, titanium malate, titanium citrate, titanium ammonium lactate, titanium triethanolamine, titanium acetylacetonate, aluminum lactate, aluminum citrate, an antimony compound, a chromium compound, an iron compound, any derivative thereof, and any combination thereof.

14. The method of claim 9 wherein the treatment fluid is introduced into the portion of the subterranean formation using one or more pumps.

15. The method of claim 9 wherein introducing the treatment fluid into the portion of the subterranean formation comprises introducing the treatment fluid at or above a pressure sufficient to create or enhance one or more fractures in the subterranean formation.

16. The method of claim 9, wherein the treatment fluid further contains at least one additional additive selected from the group consisting of: salts, surfactants, acids, proppant particulates, diverting agents, fluid loss control additives, gas, nitrogen, carbon dioxide, surface modifying agents, tackifying agents, foamers, corrosion inhibitors, scale inhibitors, clay control agents, biocides, friction reducers, antifoam agents, bridging agents, flocculants, additional H2S scavengers, CO2 scavengers, oxygen scavengers, lubricants, additional viscosifiers, weighting agents, relative permeability modifiers, resins, wetting agents, coating enhancement agents, filter cake removal agents, antifreeze agents, and any combination thereof.

* * * * *